United States Patent
Perry

(10) Patent No.: US 7,441,021 B1
(45) Date of Patent: Oct. 21, 2008

(54) METHODS AND APPARATUS FOR PRODUCING A CONFIGURATION FOR COMPONENTS OF A NETWORK

(75) Inventor: Mark Perry, Vermont (AU)

(73) Assignee: Sun Microsystems, Inc., Santa Clara, CA (US)

( * ) Notice: Subject to any disclaimer, the term of this patent is extended or adjusted under 35 U.S.C. 154(b) by 760 days.

(21) Appl. No.: 10/679,827

(22) Filed: Oct. 6, 2003

(51) Int. Cl.
*G06F 15/173* (2006.01)
*G06F 13/00* (2006.01)

(52) U.S. Cl. .................. 709/223; 709/245; 709/220; 709/226; 370/230; 370/254; 707/4; 707/5; 345/853; 345/762; 345/33

(58) Field of Classification Search .............. 709/245, 709/220–226; 345/853, 762, 333; 714/25, 714/26, 44, 45
See application file for complete search history.

(56) References Cited

U.S. PATENT DOCUMENTS 5,832,298 A * 11/1998 Sanchez et al. ............... 710/8
6,664,988 B1 * 12/2003 Rollins ......................... 715/853
7,142,868 B1 * 11/2006 Broyles et al. ............... 455/453

* cited by examiner

*Primary Examiner*—Nathan J. FLynn
*Assistant Examiner*—Jude J Jean Gilles
(74) *Attorney, Agent, or Firm*—Brooks Kushman P.C.

(57) ABSTRACT

A computerized device displays graphical representations of network components of the network where each graphical representation shows corresponding interconnections (e.g., architecture) of the network components. The computerized device also displays graphical representations of software applications for installation on the network components of the network. When a network administrator selects a particular graphical representation of the network components and a particular graphical representation of a software application, the computerized device detects the operability of the network components and the software application, related to the respective graphical representations. Based on the selections, the computerized device informs the network administrator of the operability or inoperability of the particular network component architecture with the selected software application, thereby minimizing the administrator's time in manually designing the network. Furthermore, based on the selections, the computerized device automatically configures the network components and deploys the software application onto the network components.

22 Claims, 7 Drawing Sheets

METHODS AND APPARATUS FOR PRODUCING A CONFIGURATION FOR COMPONENTS OF A NETWORK

BACKGROUND

A conventional computer network, such as a Local Area Network (LAN), typically includes an interconnection of computer systems, data communications devices, and possibly other devices, such as storage systems and printers, that allow for rapid processing and exchange of information. Organizations such as companies or universities that operate a typical computer network often employ one or more persons as network administrators or network managers to install, configure, monitor, and manage hardware components (e.g., computer devices and/or computer systems) and software applications that operate within the computer network.

When developing a computer network, the network administrator typically reviews particular requirements for the network and determines an appropriate configuration of the hardware components and software applications that form the network. In order to ensure that the computer network functions properly (e.g., operates as intended), the network administrator must research and consider the interaction among software applications installed on particular hardware components to deploy the software applications on the hardware components as an integrated architecture. Typically, the network administrator performs such research and deployment using product (e.g., software application specific) manuals and deployment guides that provide general examples for installing particular applications.

For example, Sun Open Net Environment (Sun ONE) applications (Sun Microsystems, Santa Clara, Calif.) include several application products such as a Portal Server application (e.g., used to provide policy and identity management to enforce security and access capabilities to a user) and a Directory Server application (e.g., used to store and manages user identity profiles, access privileges, and network resource information). The Portal Server includes a Portal Server installation tool that allows installation of a single Portal Server application against a single Directory Server application. In conventional networks, however, a network administrator typically installs two or more Portal Server applications against two or more Directory Server applications (e.g., Directory Server applications installed on two or more computer devices). For example, in one arrangement, a conventional network includes four computer devices configured with respective Directory Server applications (e.g., a first set of two computer devices are each configured with the Directory Server applications in a multi-master replication mode and a second set of two computer devices are configured as replicas of the multi-masters). In such a case, due to the complexity of the configuration of the applications, the network administrator manually configures the Directory Server applications and Portal Server applications against the Directory Server applications.

SUMMARY

Conventional techniques for configuring hardware and software components in a network suffer from a variety of deficiencies. For example, as indicated above, when developing a conventional computer network, the network administrator manually reviews particular requirements for the network and determines an appropriate configuration of the hardware components and software applications that form the network to deploy the software applications on the hardware components as an integrated architecture. Such manual design, however, is time consuming to the network administrator and costly to the organization owning the network (e.g., company or university). Furthermore, the when deploying the network, the network administrator typically installs the software applications manually and configures the software and hardware components manually (e.g., textually inputting configuration parameters of the hardware components and software application). Such manual deployment is also time consuming to the network administrator and error-prone.

Also as described above, when developing a conventional computer network, the network administrator uses deployment guides to manually design and deploy the hardware and software components. The manuals and deployment guides, however, typically do not provide recommendations regarding configuration of particular hardware components or integration of different software applications. In such a case, configuration of multiple hardware components and deployment of multiple software components by the administrator can be error prone and lead to improperly configured hardware and improperly installed software components in the network.

Embodiments of the present invention significantly overcome such deficiencies and provide techniques for automatically producing a configuration for components of a network. A computerized device displays graphical representations of network components of the network where each graphical representation shows corresponding interconnections (e.g., architecture) of the network components. The computerized device also displays graphical representations of software applications for installation on the network components of the network. When a network administrator selects a particular graphical representation of the network components and a particular graphical representation of a software application, the computerized device detects the operability of the network components and the software application, related to the respective graphical representations. Based on the selections, the computerized device informs the network administrator of the operability or inoperability of the particular network component architecture with the selected software application, thereby minimizing the administrator's time in manually designing the network. Furthermore, based on the selections, the computerized device automatically configures the network components and deploys the software application onto the network components to minimize the administrator's time in manually deploying the network.

In one embodiment of the invention, a computerized device receives a selection of a network component graphic representing network components for use in a network. The computerized device obtains corresponding hardware configuration information associated with the network components that corresponds to the selection of the network component graphic. The computerized device receives a selection of a software component graphic representing software for installation and operation on the network components in the network where the software component graphic has associated software configuration information. The computerized device correlates the hardware configuration information of the network components and the software configuration information of the software component graphic with network parameter information to form a correlation result representing an interoperability configuration of the software and the network components. The computerized device outputs the correlation result to support automatic configuration of the network components and the software for operation on the network components. In such a configuration, the computerized device automatically determines the operability of a software application with respect to multiple network components. Such determination minimizes the necessity for the user or network administrator to manually reconfigure the software application and network components when deployment of a particular network design results in inoperability of the network.

In one arrangement, when obtaining corresponding hardware configuration information, the computerized device retrieves the hardware configuration information from the network components corresponding to the selection of the network component graphic. Automatic retrieval of the of the hardware configuration information by the computerized device minimizes the amount of time required by the user to input the hardware configuration information to the computerize device.

In one arrangement, when correlating, the computerized device detects an operability characteristic of the network components based upon the correlation result and dynamically adjusts the hardware configuration information of the network components when the operability characteristic indicates inoperability of the software and the network components. Dynamic adjustment of the hardware configuration information minimizes the necessity for the user or network administrator to manually configure the hardware configuration information of the network components when the computerized device detects that a particular network design is inoperable.

In one arrangement, the computerized device automatically creates deployment instructions, such as a markup language document, on the correlation result, for installation of the software, represented by the selection of the software component graphic, onto the network components. The deployment instructions minimize the need for user to consult manuals and deployment guides when deploying the software on the network components, thereby minimizing the amount of time required by the network administrator in deploying a particular network architecture.

In one arrangement, the computerized device executes the markup language document to install the software on the at least one network component. By automatically installing the software application, the computerized device minimizes user error during the installation procedure (e.g., performing the steps of the installation in an order different than the order listed in the markup language document).

In one arrangement, prior to executing the markup language document, the computerized device retrieves the software from a storage location indicated by the markup language document. By automatically retrieving the software, the computerized device minimizes the amount of time required by a network administrator when installing the software and deploying the network.

In one arrangement, the computerized device receives a software identification request to identify software installed on the network components and retrieves a software identifier, in response to receiving the software identification request, where the software identifier identifies installation of the software on a network components. The computerized device, therefore, saves a user time in attempting to install an existing software application on particular network components and allows the user to detect the presence of existing, deployed network designs within the network.

In one arrangement, the network parameter information is a network parameter database of hardware component and software configuration combinations. When correlating the hardware configuration information of the at least one network component and the software configuration information of the software with network parameter information to form a correlation result, the computerized device, based on a type of network component graphic received, identifies a specific network component configuration within the network parameter database that supports operation of the selected software component. The computerized device adjusts software configuration information associated with the selected at least one software component graphic to match corresponding values of the software configuration information defined in the network parameter database that allow the software to properly operate on the specific network component configuration. The computerized device adjusts hardware configuration information associated with the selected network component graphic to match corresponding values of the hardware configuration information defined in the network parameter database that allow the network component to properly operate in conjunction with the adjusted software configuration information. The computerized device produces the correlation result that identifies the adjusted software configuration information and the adjusted hardware configuration information for operation of the software on the network component.

In one arrangement, the selected software component is selected from the group of an application server software application, a directory server software application, a mail server software application, a web server software application, and a portal server software application.

Other embodiments of the invention include a computer system, such as a computerized or electronic device or set of such devices working in conjunction with each other, a workstation, a handheld or laptop computer, or other such device or devices configured with software and/or circuitry to process all of the method operations disclosed herein as embodiments of the invention. In such embodiments, the computerized device includes an interface (e.g., a network interface for receiving data such as the sets of distribution data), a memory (e.g., any type of computer readable medium), a processor and an interconnection mechanism connecting the interface, the processor and the memory. In such embodiments, the memory system is encoded with a network configuration application that when performed on the processor, produces a network configuration process that causes the computerized device to perform any and/or all of the method embodiments, steps and operations explained herein as embodiments of the invention to allow management of the application. In other words, a computer that is programmed to operate as explained herein is considered an embodiment of the invention.

Other arrangements of embodiments of the invention that are disclosed herein include software programs to perform the method embodiment steps and operations summarized above and disclosed in detail herein. As an example, a network configuration software application configured to operate as explained herein is considered an embodiment of the invention. More particularly, a computer program product is disclosed which has a computer-readable medium including computer program logic encoded thereon that, when executed on at least one processor with a computing system, causes the processor to perform the operations (e.g., the methods) indicated herein as embodiments of the invention. Such arrangements of the invention are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computer system, a data processing system or other device to cause the computer system to perform the techniques explained herein as embodiments of the invention including network configuration aspects of the invention.

It is to be understood that the system of the invention can be embodied strictly as a software program, as software and hardware, or as hardware or circuitry alone and may be a combination of such elements in a single device or distributed within a system such as a software development or an equivalent system.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the present invention provide techniques for automatically producing a configuration for components of a network. A computerized device displays graphical representations of network components of the network where each graphical representation shows corresponding interconnections (e.g., architecture) of the network components. The computerized device also displays graphical representations of software applications for installation on the network components of the network. When a network administrator selects a particular graphical representation of the network components and a particular graphical representation of a software application, the computerized device detects the operability of the network components and the software application, related to the respective graphical representations. Based on the selections, the computerized device informs the network administrator of the operability or inoperability of the particular network component architecture with the selected software application, thereby minimizing the administrator's time in manually designing the network. Furthermore, based on the selections, the computerized device automatically configures the network components and deploys the software application onto the network components to minimize the administrator's time in manually deploying the network.

Figure 1:
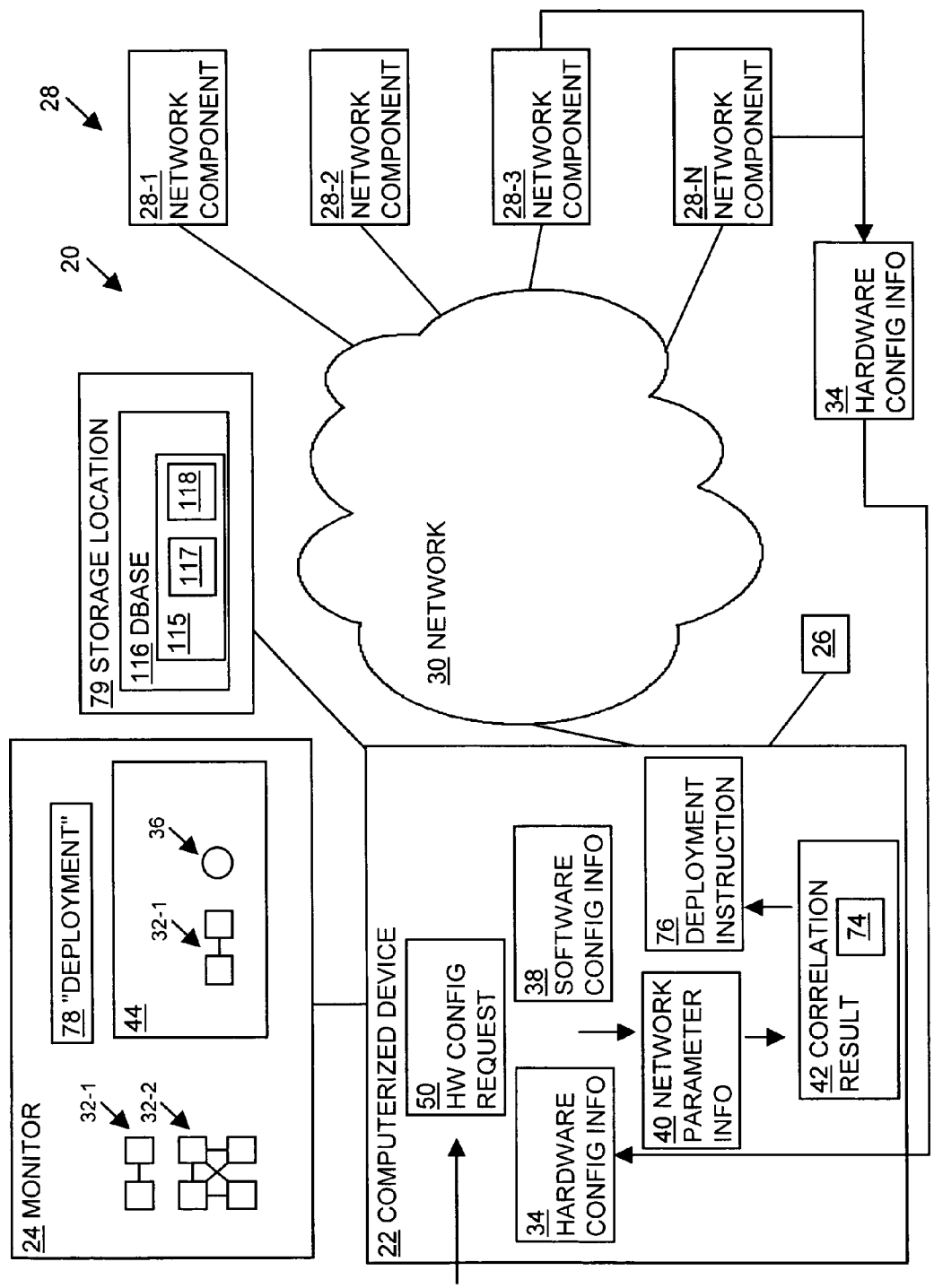
FIG. 1 shows a computer system, according to one embodiment of the invention.

FIG. 1 shows a computer system 20 suitable for using embodiments of the invention. The computer system 20 includes a computerized device 22, network components 28, and a network 30.

The computerized device 22 is configured to aid in the design of the network 30 and the deployment of a software application with multiple network components 28 associated with the network 30. In one arrangement, the computerized device 22 is a computer, such as a personal computer. The computerized device 22, in one arrangement, is configured with a Graphical User Interface (GUI) and includes a monitor 24 and an input device 26, such as a mouse or keyboard. The monitor 24 and input device 26 allows a user (e.g., network administrator) to view operation of, and interact with, the computerized device 22.

The network components 28 are configured as hardware components of the computer system 20. For example, the network components 28 are computers, such as computer servers. In one arrangement, the network components 28 are configurable as message servers of an electronic mail (e.g., email) system. For example, the message servers 48 act on the front end of the network 30 to relay email messages from a source device to a destination device or act on the back end of the network 30 to store email messages received from a source device.

The network 30 allows communication among the network components 28 of the computer system 20. The network 30 also allows communication between the computerized device 22 and the network components 28. In one arrangement, the network 28 is an ad hoc wireless network. In another arrangement, the network 28 is a computer network, such as the Internet or a local area network (LAN).

Figure 2:
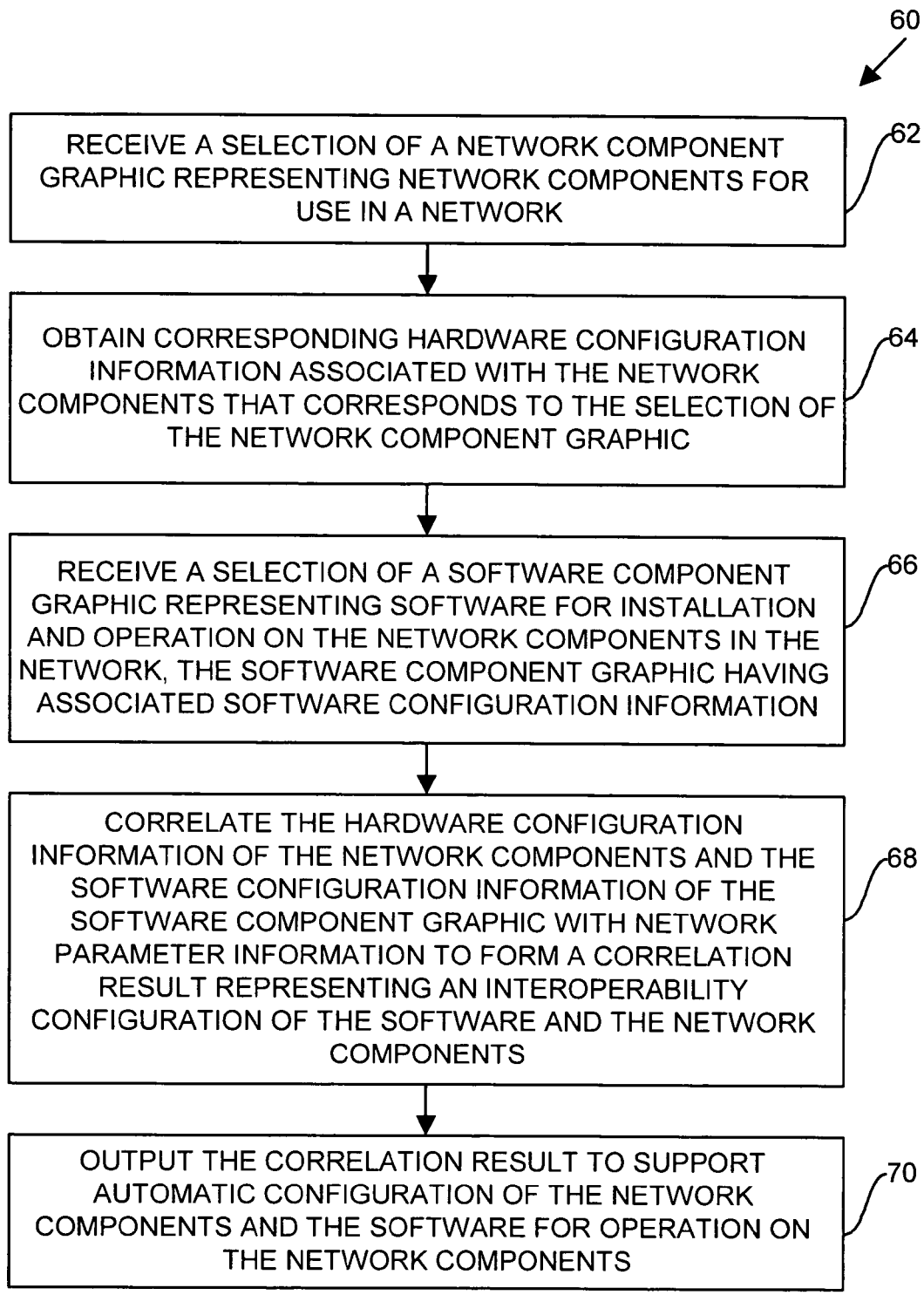
FIG. 2 illustrates a flow chart of a procedure performed by the computer system of FIG. 1, according to one embodiment of the invention.

FIG. 2, taken in conjunction with FIG. 1, illustrates a flow chart 60 of a procedure performed by the computerized device 22 of FIG. 1. During operation, the computerized device 22 automatically produces a configuration for network (e.g., hardware) components 28 of the network 30 and software applications to allow integrated deployment of the software applications on the network 30.

In step 62, the computerized device 22 receives a selection of a network component graphic 32 representing network components 28 for use in the network 30. In one arrangement, during operation, the computerized device 22 displays, on the monitor 24, network component graphics 32 (e.g., icons) representing various arrangements (e.g., interconnections or configurations) of the network components 28 within the network 30. For example, each network component graphic 32 shows a corresponding pattern that represents particular connections or links between the network components 28 for particular configurations of the network components 28.

For example, assume a user (e.g., network administrator) wants to deploy the network components 28 of the network 30 as directory servers. In such a case, the computerized device 22 displays the network component graphics 32 as director server configurations of the network components 28. For example, as illustrated in FIG. 1, the computerized device displays network component graphics 32-1 and 32-2 where the first network component graphic 32-1 represents two directory servers in multi-master mode and the second network component graphic 32-2 represents two directory servers in multi-master mode with two replicators. Based upon the requirements for the network 30 (e.g., a particular network design), the user "selects" a particular network component graphic 32 (e.g., using the mouse 26) and places the network component graphic 32-1 within a working field 44 displayed by the monitor 44. In one arrangement, the computerized device 22 receives the selected network component graphic 32-1 when the user places the network component graphic 32-1 within the working field 44.

Returning to FIG. 2, in step 64, the computerized device 22 obtains corresponding hardware configuration information 34, associated with the network components 28, that corresponds to the selection of the network component graphic 32. In one arrangement, the hardware configuration information 34 relates to parameters associated with the network components 28 represented by the network component graphic 32. For example, the hardware configuration information 34 includes the host names of the network components 28, the Internet Protocol (IP) addresses of the network components 28, the number of users supported by each of the network components 28, and the performance metrics associated with each of the network components 28.

In step 66, the computerized device 22 receives a selection of a software component graphic 36 representing software for installation and operation on the network components 28 in the network 30, the software component graphic 36 having associated software configuration information 38. The software configuration information 38 indicates, in one arrangement, the type of software application selected by the user. In one arrangement, the software configuration information 38 of the software component graphic 36 identifies the type of the associated software application represented by the software component graphic 36. For example, the software configuration information 38 identifies the software as being an application server software application, a directory server software application, a messaging or mail server software application, a web server software application, or a portal server software application.

In one arrangement, during operation, the computerized device 22 displays, on the monitor 24, software component graphics 36 (e.g., icons) of various software applications available for deployment on the network 30. For example, based upon the requirements for the network 30, the user "selects" a particular software component graphic 36 (e.g., using the mouse 26) and "drops" the software component graphic 36 onto the network component graphic 32 located within the working field 44. The computerized device 22, therefore, receives the selected software component graphic 36 when the user places the software component graphic 36 within the working field 44.

In step 68, the computerized device 22 correlates the hardware configuration information 34 of the network components 28 and the software configuration information 38 of the software component graphic 32 with network parameter information 40 to form a correlation result 42 representing an interoperability configuration of the software and the network components 28. In one arrangement, the network parameter information 40 relates to known design rules based upon "best-practices" for network design and deployment. By correlating or comparing the hardware configuration information 34, the software configuration information 38, and the known design rules to form the correlation result 42, the computerized device 22 performs a design check on the user-selected arrangement of the network components 28 and software application to detect (e.g., predict) if the selected software application (e.g., as represented by the software component graphic 36) works, or properly operates, on the selected configuration of the network components 28 (e.g., as represented by the network component graphic 32-1).

In step 70, the computerized device 22 outputs the correlation result 42 to support automatic configuration of the network components 28 and the software for operation on the network components 28. For example, in one arrangement, the computerized device 22 displays the correlation result 42 on the monitor 24 to indicate, to the user, the operability or inoperability of the software application (e.g., as represented by the software component graphic 36) with respect to the configuration of network components 28 (e.g., as represented by the network component graphic 32-1). Based upon reception of a positive correlation result 42 (e.g., indicating operability of the software application with respect to the configuration of network components 28), the user can then decide to proceed with installation (e.g., deployment) of the software application on the network components 28, as described herein. Based upon reception of a negative correlation result 42 (e.g., indicating inoperability of the software application with respect to the configuration of network components 28), the user can then allow the computerized device 22 to modify the hardware configuration information 34 associated with the network components 28 in order to achieve a positive correlation result 42, as described herein.

As indicated above, the computerized device 22 receives a selection of a network component graphic 32 that represents a particular configuration of the network components 28 in the network 30. For example, the network component graphic 32 shows a pattern that represents particular connections or links among the network components 28 for particular deployment arrangements of the network components 28. By displaying the network component graphics 32 in such a pattern, the computerized device 22 allows a user to select an appropriate network component (e.g., hardware) configuration of the network components 28 based upon a visual representation of particular network component configurations and without requiring the user to have a knowledge of the intricacies of the software instructions represented by the deployment pattern.

Also as indicated above, when performing the steps shown in FIG. 2, the computerized device 22 automatically produces a configuration for network components 28 and software components of the network 30 to allow functional deployment of the software application relative to the network components 28. The computerized device 22 automatically determines the operability of a software application with respect to multiple network components 28. Such determination minimizes the necessity for the user or network administrator to manually reconfigure the software application and network components 28 when deployment of a particular network design results in inoperability of the network 30. By having the computerized device 22 determine the operability of a software application with respect to multiple network components 28, the computerized device reduces the amount of time required by the user to reconfigure the software application and network components 28 to allow for operability of the network 30.

As indicated above, the computerized device 22 obtains the hardware configuration information 34 associated with the network components 28 that correspond to the selected network component graphic 32. In one arrangement, as shown in FIG. 1, the computerized device 22 retrieves the hardware configuration information 34 from the network components 28 corresponding to the network component graphic 32. In one arrangement, in the case where the network component graphic 32-1 represents an interconnection between network component 28-3 and network component 28-N, the computerized device 22 retrieves the respective hardware configuration information 34 from the network components 28-3 and 28-N. In another arrangement, the computerized device 22 retrieves the respective hardware configuration information 34 for the network components 28-3 and 28-N from a storage location 79 of the computer system 20. In either arrangement, automatic retrieval of the of the hardware configuration information 34 by the computerized device 22 minimizes the amount of time required by the user to input hardware configuration information 34 into the computerized device 22 and configure the network components 28 and the software application in the network 30.

In embodiments of the present invention, as indicated above, the computerized device 22 correlates the hardware configuration information 34 of the network components 28 and the software configuration information 38 of the software component graphic 32 with network parameter information 40 to form a correlation result 42 representing an interoperability configuration of the software and the network components 28. In certain cases, the correlation result 42 indicates inoperability of the software application with respect to the network components 28. In one arrangement, when such cases occur, the computerized device 22 is configured to modify the hardware configuration information 34 associated with the network components 28 in order to achieve a positive correlation result 42 and indicate operability of the software application with respect to the configuration of network components 28.

Figure 3:
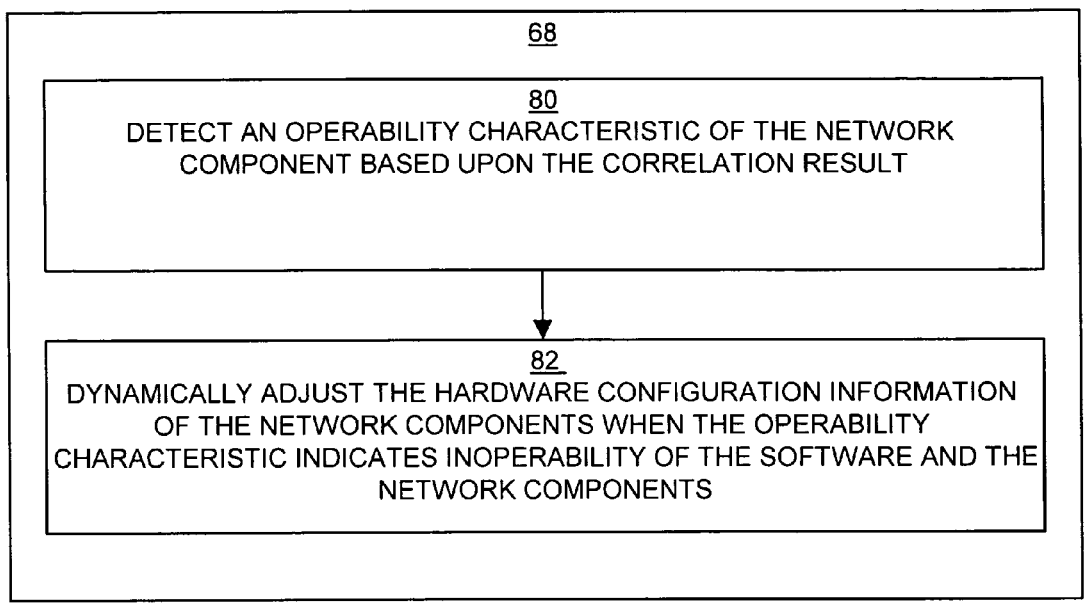
FIG. 3 illustrates a flow chart of a procedure performed by the computer system of FIG. 1, according to one embodiment of the invention.

FIG. 3 illustrates a flow chart 60 of a procedure performed by the computerized device 22 of FIG. 1 when the computerized device 22 correlates the hardware configuration information 34, the software configuration information 38, and the network parameter information 40, as described with respect to FIG. 2.

In step 80, the computerized device 22 detects an operability characteristic 74 of the network components 28 based upon the correlation result 42. For example, the operability characteristic 74 indicates either the operability of the software with the network components 28 (e.g., the selected software application works or properly operates on the selected network components 28) or the inoperability of the software and the network components 28 (e.g., the selected software application improperly operates on the selected network components 28).

In step 82, the computerized device 22 dynamically adjusts the hardware configuration information 34 of the network components 28 when the operability characteristic 74 indicates inoperability of the software and the network components 28. For example, in one arrangement, when dynamically adjusting the hardware configuration information 34 of the network components 28, the computerized device retrieves modified hardware configuration information 34 from a storage location 79, such as a database associated with the computer system 20.

After dynamically adjusting the hardware configuration information 34 of the network components 28, the computerized device 22, in turn, correlates the dynamically adjusted hardware configuration information 34 with the software configuration information 38 and the network parameter information 40 to form a revised correlation result 42 indicating operability of the network design (e.g., operation of the selected network component configuration and the software application). By dynamically adjusting the hardware configuration information 34 of the network components 28 the computerized device 22 creates an operable configuration of the network components 28 and the software application. Dynamic adjustment of the hardware configuration information 34, therefore, minimizes the necessity for the user or network administrator to manually configure network components 28 (e.g., the hardware configuration information 34 of the network components 28) when the computerized device 22 detects that a particular network design is inoperable. Dynamic adjustment of the hardware configuration information 34 also minimizes the necessity for the user to manually configure network components 28 on a "trial-and-error" basis until the user achieves an operable network design.

In one arrangement, when the computerized device 22 detects interoperability of the software and the network components 28, the computerized device 22 is configured to deploy the network 30 and install the software application onto the network components 28.

Figure 4:
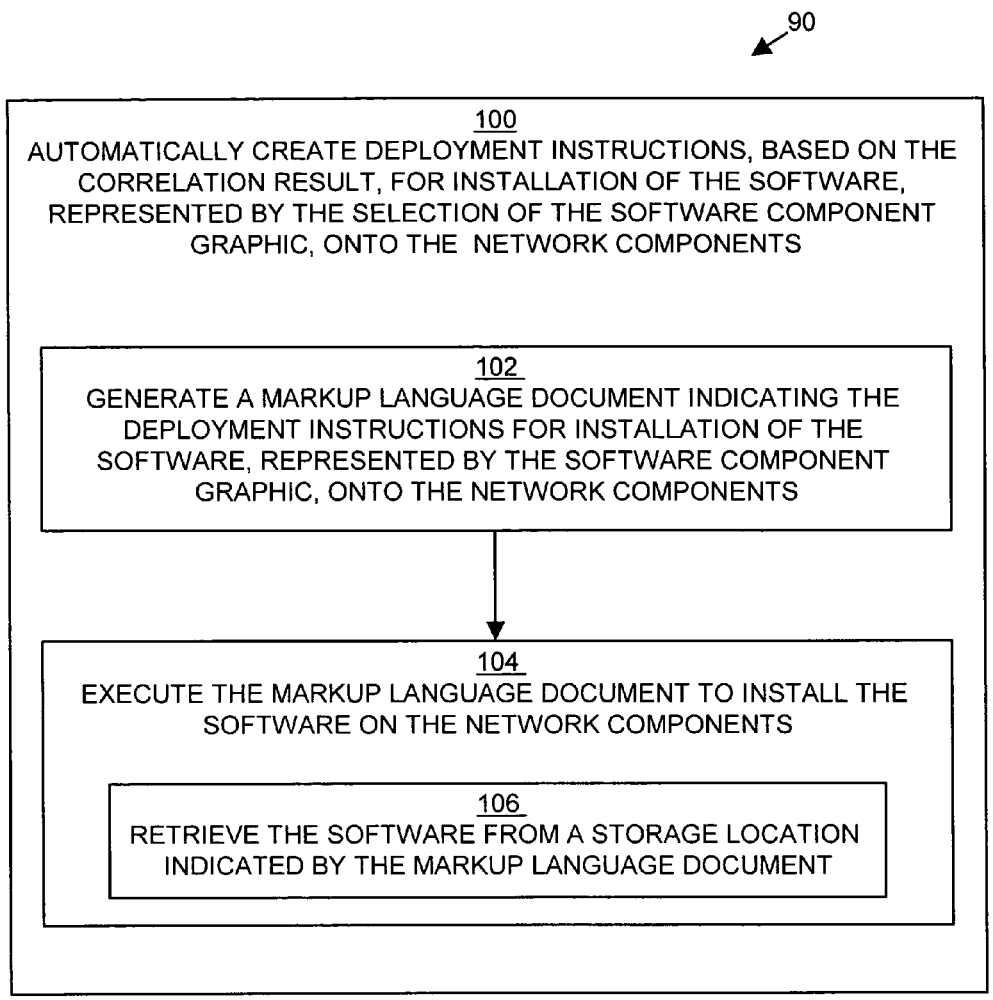
FIG. 4 illustrates a flow chart of a procedure performed by the computer system of FIG. 1, according to one embodiment of the invention.

FIG. 4 illustrates a flow chart 90 of a procedure performed by the computerized device 22 of FIG. 1.

In step 100, the computerized device 22 automatically creates deployment instructions 76, based on the correlation result 42, for installation of the software, represented by the selection of the software component graphic 36, onto the network components 28. In one arrangement, the deployment instructions 76 textually describe the configuration of the network components 28 and the dependencies (e.g., deployment order) of the software application on the network components 28 during the deployment process (e.g., first install a directory server, second install two master directories in parallel, third configure replication agreements among the network components 28, fourth install portal servers, etc). In such an arrangement, the deployment instructions 76 provide a user (e.g., network administrator) with a step-by-step process for manually deploying a given network architecture (e.g., installing a software application on a particular configuration of network components 28 in the network 30). The deployment instructions 76, therefore, minimize the need for user to consult manuals and deployment guides when deploying the software on the network components 28. As such, the deployment instructions 76 minimizes the potential for user error during deployment and leads to the user properly configuring the network components 28 and properly installing the software components in the network 30.

Steps 102 and 104 illustrate one arrangement of the procedure 100 performed by the computerized device 22, when the computerized device 22 creates deployment instructions 76.

In step 102, the computerized device 22 generates a markup language document indicating the deployment instructions 76 for installation of the software, represented by the software component graphic, onto the network component 28. For example, in one arrangement, the markup language document is configured in an Extensible Markup Language (XML) format. The markup language document textually describes the configuration of the network components 28 and the dependencies (e.g., deployment order) of the software application on the network components 28 during the deployment process.

In step 104, the computerized device 22 executes the markup language document to install the software on the at least one network component 28. For example, the computerized device 22 displays a "Deployment" option 78 on the monitor 24 (e.g., as a GUI icon). In such a case, the user engages the "Deployment" option 78 by using the mouse 26 to "click" on the "Deployment" option 78 to cause the computerized device to execute the markup language document. For example, in one arrangement, when executing the markup language document, the computerized device 22 checks the environments of network components 28 (e.g., checks for correct parities, adequate amount of disk space, etc.). The computerized device 22 then copies the software application, as represented by the software component graphic 36, to the network components 28, as represented by the network component graphic 32, unpacks the software application, and installs the software application onto the network components 28 according to the deployment instructions listed within the markup language document.

When executing the markup language document (e.g., after the user engages the "Deployment" option 78), the computerized device 22 automatically installs the software application onto the network components 28 of the network 30. Such automatic installation minimizes user error in installing the software application (e.g., the user inadvertently configuring the network components 28 improperly as indicated by the markup language document) and minimizes the user's involvement time for installation of the software application and configuration of the network components 28.

Step 104 relates to the computerized device 22 executing the markup language document to install the software application on the network components 28 and assumes that the computerized device 22 stores the software application to be installed on the network components 28. In such a case, the user must manually transfer the software application from some storage location or media (e.g., floppy disk) to storage (e.g., memory) associated with the computerized device 22. Such manual transfer is time consuming to the user.

In step 106, the computerized device 22 when executing the markup language document, retrieves the software from a storage location indicated by the markup language document. For example, the markup language document includes a Uniform Resource Locator (URL) of a storage location 79 (e.g., an Internet-based server device or a directory local to the computer system 20) having the software application to be installed on the network components 28. When executing the markup language document, the computerized device 22 forms a communications link with the storage location 79 at the URL and retrieves the software application form the storage location 79. Such automatic retrieval of the software application, by the computerized device 22, minimizes the amount of time required by a network administrator when deploying the network 30.

In one arrangement of the network 30, the network components 28 have previously-installed software applications (e.g., applications installed prior to the computerized device 22 receiving the hardware component graphic 32 or the software component graphic 36). In such an arrangement, the computerized device 22 is configured to allow a user to determine the presence of previously installed software applications on the network components 28. The computerized device 22, therefore, allows the user to verify the presence or absence of particular software applications on the network devices 28 of network 30 and confirm a current configuration of each network component 28. For example, in the case where the user verifies the presence of a particular software application on the network 30, such verification saves the user time in attempting to reinstall the particular software application (e.g., as part of deploying a given network architecture).

Figure 5:
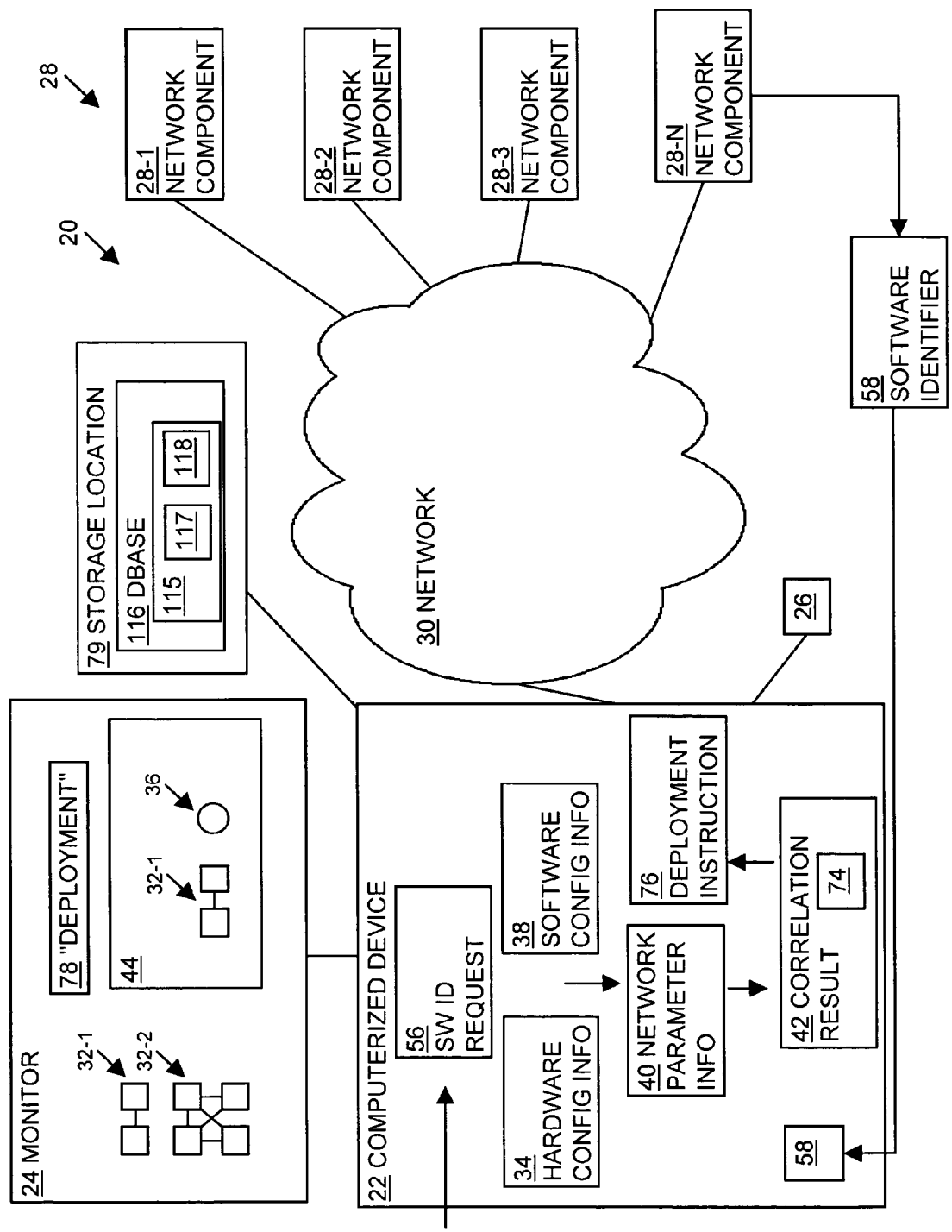
FIG. 5 illustrates the computer system of FIG. 1, according to one embodiment of the invention.

FIG. 5 illustrates the computer system 20 where the computerized device 22 is configured to allow a user to determine the presence of previously installed software applications on the network components 28. In one arrangement, the computerized device 22 receives a software identification request 112 to identify software installed on a network component 28 in the network. For example, a user inputs the software identification request 112, either graphically or textually, using the input device 26 (e.g., the mouse or a keyboard). The software identification request 112, in one arrangement, causes the computerized device 22 to scan the network 30 to obtain software configuration details for all the network components 28 associated with the network 30. In another arrangement, the software identification request 112 causes the computerized device 22 to scan a particular network component 28-N for details regarding the software currently installed on the network component 28-K In response to receiving the software identification request 112, the computerized device 22 retrieves a software identifier 114 that identifies installation of software on the network component 28. In one arrangement, the computerized device displays on the monitor 26 the software identifier 114 to allow the user to review the software applications currently installed on the network components 28. When the user identifies the presence of a particular software application on a network component 28 of the network 30, such identification saves the user time in attempting to install an existing software application on particular network components 28 and allows the user to detect the presence of existing, deployed network designs within the network 30.

As indicated above, in certain cases, a network administrator selects a software component, represented by a software component graphic 36, that is incompatible or inoperable with network components 32, represented by a network component graphic 32 (e.g., the network components 28 are not configured to execute the software application). In one arrangement, the storage location 79 of the computer system 20 stores network parameter information 40 as a network parameter database. The network parameter database 116 includes operable combinations network components 28 and corresponding software applications (e.g., combinations that work when deployed). The database also includes hardware configuration information 34 associated with the network components 28 and software configuration information associated with the software. The computerized device 22 utilizes the network parameter database 116 when to ensure compatibility between the network components 28 and the software.

Figure 6:
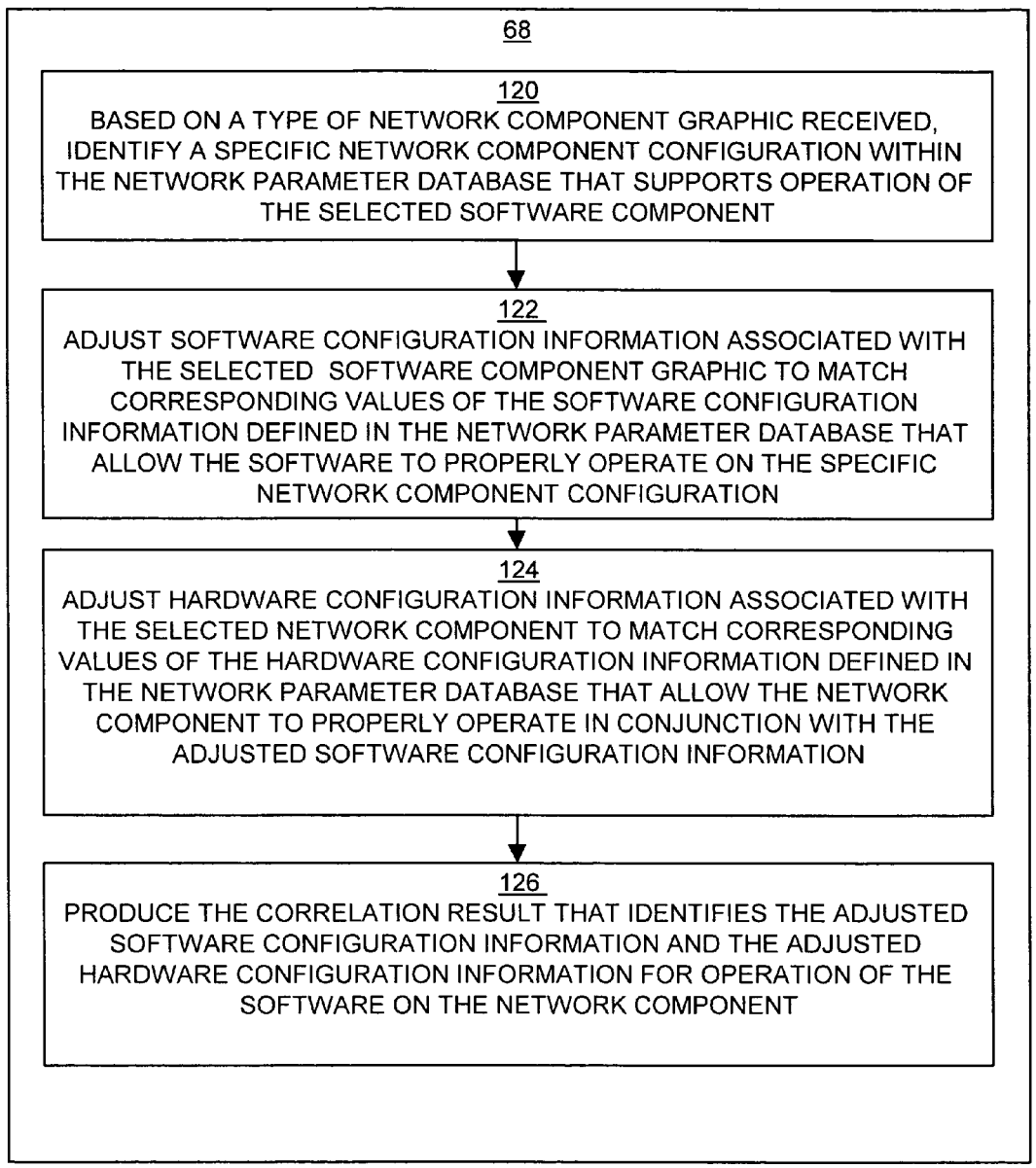
FIG. 6 illustrates a flow chart of a procedure performed by the computer system of FIG. 1, according to one embodiment of the invention.

FIG. 6 illustrates a flow chart 90 of a procedure performed by the computerized device 22 of FIG. 1 when the computerized device 22 utilizes the network parameter database 116 when correlating the hardware configuration information 34 of the network component 28, the software configuration information 38 of the software, and the network parameter information 40 to form a correlation result 42.

In step 120, based on a type of network component graphic 32 received, the computerized device 22 identifies a specific network component configuration 115 within the network parameter database 116 that supports operation of a selected software component (e.g., software application selected by the user). For example, assume the user selects a network component graphic 32 representing two directory servers in multi-master mode. Based upon the selection, the computerized device 22 identifies, within the database 116 a corresponding network component configuration 115 that relates to the two directory servers in multi-master mode and that also supports the software component or application as selected by the user.

In step 122, the computerized device 22 adjusts software configuration information 38 associated with the selected software component graphic to match corresponding values of the software configuration information 117 defined in the network parameter database 116 that allow the software to properly operate on the specific network component configuration. For example, in the case where the software configuration information 38 of the software application does not correspond (e.g., is not equivalent to) the software configuration information 117 within the database 116, the computerized device adjusts the software configuration information 38 of the software application to match the software configuration information 117 within the database 116.

In step 124, the computerized device 22 adjusts hardware configuration information 34 associated with the selected network component graphic to match corresponding values of the hardware configuration information defined in the network parameter database 116 that allow the network component 28 to properly operate in conjunction with the adjusted software configuration information 38. For example, in the case where the hardware configuration information 34 of the network component 28 does not correspond (e.g., is not equivalent to) the hardware configuration information 118 within the database 116, the computerized device 22 adjusts the hardware configuration information 34 of the network component 28 to match the hardware configuration information 118 within the database 116.

In step 126, the computerized device 22 produces the correlation result 42 that identifies the adjusted software configuration information and the adjusted hardware configuration information for operation of the software on the network component 28. By adjusting the hardware configuration information 34 based upon the hardware configuration information located in the database 116 and by adjusting the software configuration information 38 based upon the software configuration information located in the database 116, the computerized device provides compatibility between the software and the network component 28 regardless of the respective selections (software application selection and network component configuration selection) by the user.

Figure 7:
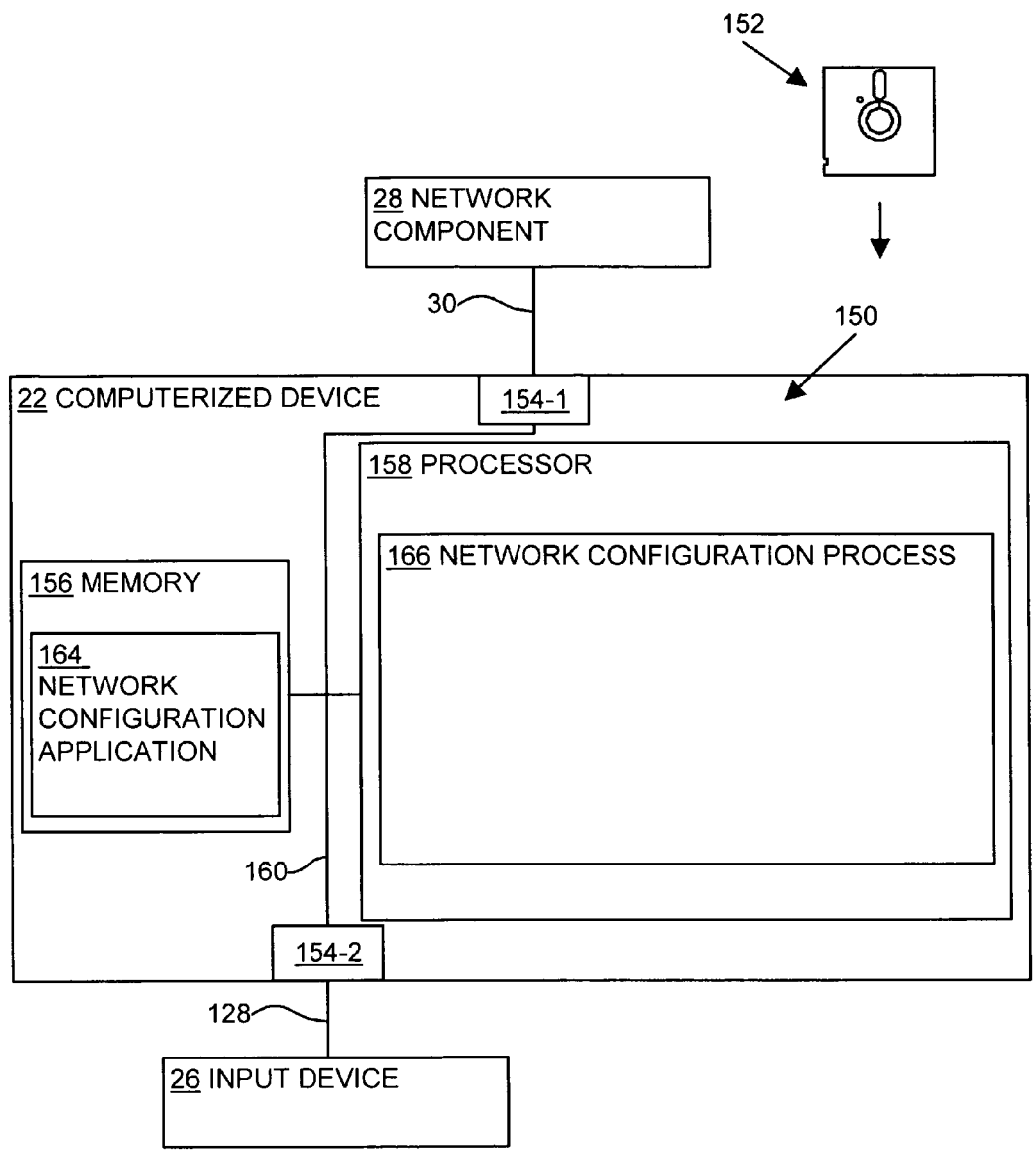
FIG. 7 depicts a computer implementation of a computerized device, according to one embodiment of the invention.

FIG. 7 illustrates a more detailed configuration of the computerized device 22. A computer program product 152 includes an application or logic instructions that are loaded into the computerized device 22 to configure the device 22 to automatically produce a configuration for components of a network.

The computerized device 22, in this example embodiment of the invention, includes an interconnection mechanism 160 such as a data bus and/or other circuitry that interconnects a controller 150, having a memory 156 and a processor 158, and one or more communications interfaces 154. A first communication interface 154-1 connects with a network component 28 via the network 30. A second communication interface 154-2 connects with an input device 26 via a connection 128.

The memory 156 may be any type of volatile or nonvolatile memory or storage system such as computer memory (e.g., random access memory (RAM), read-only memory (ROM), or other electronic memory), disk memory (e.g., hard disk, floppy disk, optical disk and so forth). The memory 156 is encoded with logic instructions (e.g., software code) and/or data that form a network configuration application 164 configured according to embodiments of the invention. In other words, the network configuration application 164 represents software code, instructions and/or data that represent or convey the processing logic steps and operations as explained herein and that reside within memory or storage or within any computer readable medium accessible to the computerized device 22.

The processor 158 represents any type of circuitry or processing device such as a central processing unit, microprocessor or application-specific integrated circuit that can access the network configuration application 164 encoded within the memory 156 over the interconnection mechanism 160 in order to execute, run, interpret, operate or otherwise perform the network configuration application 164 logic instructions. Doing so forms the network configuration process 166. In other words, the network configuration process 166 represents one or more portions of the logic instructions of the network configuration application 164 while being executed or otherwise performed on, by, or in the processor 158 within the computerized device 22. The computerized device 22 in FIG. 1 collectively represents either one or both of the network configuration application 164 and the network configuration process 166.

Those skilled in the art will understand that there can be many variations made to the embodiments explained above while still achieving the same objective of those embodiments and the invention in general.

As indicated above, in one arrangement, the computerized device automatically retrieves the hardware configuration information 34 for the network components associated with a particular network component graphic. Such an arrangement is by way of example only. In another arrangement, the user (e.g., network administrator) manually inputs the hardware configuration information 34 into the computerized device 22. For example, the user, using the mouse 26, "selects" the network component graphic 32-1 and engages a "Set Properties" command associated with the network component graphic 32-1. Engagement of the "Set Properties" command produces a data entry display that allows the user to manually enter the hardware configuration information 34 associated with the network components 28 represented by the network component graphic.

As described above, the computerized device 22 generates a markup language document indicating the deployment instructions 76 for installation of the software, represented by the software component graphic, onto the network component 28. In one arrangement, the computerized device 22 displays a "Deployment" option 78 on the monitor 24. When the user engages the "Deployment" option 78 by using the mouse 26 to "click" on the GUI representation of the "Deployment" option 78 (e.g., graphically executes the "Deployment" option 78), the computerized device 22 executes the markup language document. Such an arrangement is by way of example only. In another arrangement, the user executes the "Deployment" option as a command line (e.g., textual) entry to the computerized device 22.

Such variations are intended to be covered by the scope of this invention. As such, the foregoing description of embodiments of the invention is not intended to be limiting. Rather, any limitations to the invention are presented in the following claims.

What is claimed is:

1. In a computerized device, a method for automatically producing a configuration for components of a network comprising:

receiving a selection of at least one network component graphic representing at least one network component for use in a network;

obtaining corresponding hardware configuration information associated with the at least one network component that corresponds to the selection of the at least one network component graphic;

receiving a selection of at least one software component graphic representing software for installation and operation on the at least one network component in the network, the software component graphic having associated software configuration information;

correlating the hardware configuration information of the at least one network component and the software configuration information of the software component graphic with network parameter information to form a correlation result representing an interoperability configuration of the software and the at least one network component, wherein correlating further includes:

detecting an operability characteristic of the at least one network component based upon the correlation result; and dynamically adjusting the hardware configuration information of the at least one network component when the operability characteristic indicates inoperability of the software and the at least one network component; and outputting the correlation result to support automatic configuration of the at least one network component and the software for operation on the at least one network component.

2. The method of claim 1 further comprising automatically creating deployment instructions, based on the correlation result, for installation of the software, represented by the selection of at least one software component graphic, onto the at least one network component.

3. The method of claim 2 wherein the step of automatically creating comprises generating a markup language document indicating the deployment instructions for installation of the software, represented by the software component graphic, onto the at least one network component.

4. The method of claim 3 further comprising executing the markup language document to install the software on the at least one network component.

5. The method of claim 4 wherein the step of executing comprises retrieving the software from a storage location indicated by the markup language document.

6. The method of claim 1 wherein the step of obtaining corresponding hardware configuration information comprises retrieving the hardware configuration information from the at least one network component corresponding to the selection of the at least one network component graphic.

7. The method of claim 1 further comprising:
receiving a software identification request to identify software installed on at least one network component; and
retrieving a software identifier, in response to receiving the software identification request, the software identifier identifying installation of the software on at least one network component.

8. The method of claim 1 wherein:
the network parameter information is a network parameter database of hardware component and software configuration combinations; and
wherein correlating the hardware configuration information of the at least one network component and the software configuration information of the software with network parameter information to form a correlation result comprises:
based on a type of network component graphic received, identifying a specific network component configuration within the network parameter database that supports operation of the selected at least one software component;
adjusting software configuration information associated with the selected at least one software component graphic to match corresponding values of the software configuration information defined in the network parameter database that allow the software to properly operate on the specific network component configuration;
adjusting hardware configuration information associated with the selected at least one network component graphic to match corresponding values of the hardware configuration information defined in the network parameter database that allow the network component to properly operate in conjunction with the adjusted software configuration information; and
producing the correlation result that identifies the adjusted software configuration information and the adjusted hardware configuration information for operation of the software on the at least one network component.

9. The method of claim 8 wherein the at least one selected software component is at least one of:
i.) an application server software application;
ii.) a directory server software application;
iii.) a mail server software application;
iv.) a web server software application; and
v.) a portal server software application.

10. A computerized device comprising:
at least one communications interface;
a controller; and
an interconnection mechanism coupling the at least one communications interface and the controller;
wherein the controller is configured to:
receive a selection of at least one network component graphic representing at least one network component for use in a network;
obtain corresponding hardware configuration information associated with the at least one network component that corresponds to the selection of the at least one network component graphic;
receive a selection of at least one software component graphic representing software for installation and operation on the at least one network component in the network, the software component graphic having associated software configuration information;
correlate the hardware configuration information of the at least one network component and the software configuration information of the software component graphic with network parameter information to form a correlation result representing an interoperability configuration of the software and that at least one network component, wherein when correlating, the controller is further configured to:
detect an operability characteristic at least one network component based upon the correlation result; and
dynamically adjust the hardware configuration information of the at least one network component when the operability characteristic indicates inoperability of the software and the at least one network component; and
output the correlation result to support automatic configuration of the at least one network component and the software for operation on the at least one network component.

11. The computerized device of claim 10 wherein the controller is configured to automatically create deployment instructions, based on the correlation result, for installation of the software, represented by the selection of at least one software component graphic, onto the at least one network component.

12. The computerized device of claim 11 wherein the controller, when creating, is configured to create a markup language document indicating instructions for installation of the software, represented by the software component graphic, onto the at least one network component.

13. The computerized device of claim 12 wherein the controller is configured to execute the markup language document to install the software on the at least one network component.

14. The computerized device of claim 13 wherein the controller, when executing, is configured to retrieve the software from a storage location indicated by the markup language document.

15. The computerized device of claim 10 wherein the controller, when obtaining corresponding hardware configuration information, is configured to retrieve the hardware configuration information from the at least one network component corresponding to the selection of the at least one network component graphic.

16. The computerized device of claim 10 wherein the controller is configured to:
receive a software identification request to identify software installed on at least one network component; and
retrieve a software identifier, in response to receiving the software identification request, the software identifier identifying installation of the software on at least one network component.

17. The computerized device of claim 10 wherein:
the network parameter information is a network parameter database of hardware component and software configuration combinations; and
when correlating the hardware configuration information of the at least one network component and the software configuration information of the software with network parameter information to form a correlation result, the controller is configured to:
based on a type of network component graphic received, identify a specific network component configuration within the network parameter database that supports operation of the selected at least one software component;
adjust software configuration information associated with the selected at least one software component graphic to match corresponding values of the software configuration information defined in the network parameter database that allow the software to properly operate on the specific network component configuration;
adjust hardware configuration information associated with the selected at least one network component graphic to match corresponding values of the hardware configuration information defined in the network parameter database that allow the network component to properly operate in conjunction with the adjusted software configuration information; and
produce the correlation result that identifies the adjusted software configuration information and the adjusted hardware configuration information for operation of the software on the at least one network component.

18. The computerized device of claim 17 wherein the at least one selected software component is at least one of:
i.) an application server software application;
ii.) a directory server software application;
iii.) a mail server software application;
iv.) a web server software application; and
v.) a portal server software application.

19. A computer program product having a computer-readable medium including computer program logic encoded thereon that, when performed on a controller in a computerized device having a coupling to at least one communications interface provides a method for performing the operations of:

receiving a selection of at least one network component graphic representing at least one network component for use in a network;
obtaining corresponding hardware configuration information associated with the at least one network component that corresponds to the selection of the at least one network component graphic;
receiving a selection of at least one software component graphic representing software for installation and operation on the at least one network component in the network, the software component graphic having associated software configuration information;
correlating the hardware configuration information of the at least one network component and the software configuration information of the software component graphic with network parameter information to form a correlation result representing an interoperability configuration of the software and the at least one network component, wherein correlating further includes:
detecting an operability characteristic of the at least one network component based upon the correlation result; and
dynamically adjusting the hardware configuration information of the at least one network component when the operability characteristic indicates inoperability of the software and the at least one network component; and
outputting the correlation result to support automatic configuration of the at least one network component and the software for operation on the at least one network component.

20. The method of claim 1 wherein a network component graphic includes interconnections between that network component and other network components according to one or more configurations, the method comprising:
deploying the software to the at least one network component and configuring the at least one network component with the software according to correlation result.

21. The computerized device of claim 10 wherein a network component graphic includes interconnections between that network component and other network components according to one or more configurations, and wherein the controller is configured to:
deploy the software to the at least one network component and configure the at least one network component with the software according to correlation result.

22. The computer program product of claim 19 wherein a network component graphic includes interconnections between that network component and other network components according to one or more configurations, and wherein the computer program product performs the operations of:
deploying the software to the at least one network component and configuring the at least one network component with the software according to correlation result.

* * * * *